United States Patent
Daouk et al.

(10) Patent No.: US 7,809,593 B2
(45) Date of Patent: Oct. 5, 2010

(54) METHOD AND SYSTEM FOR AUTOMATICALLY KEEPING TRAVEL DATA CONSISTENT BETWEEN PASSENGER RESERVATION RECORDS AND CORRESPONDING ELECTRONIC TICKETS

(75) Inventors: Carine Hassan Daouk, Antibes (FR); Florent Mahoudeau, Antibes (FR); Christophe Defayet, Grasse (FR); Eric Boudin, Roquefort les Pins (FR); Santiago Iglesias, Antibes (FR)

(73) Assignee: Amadeus s.a.s., Biot (FR)

( * ) Notice: Subject to any disclaimer, the term of this patent is extended or adjusted under 35 U.S.C. 154(b) by 672 days.

(21) Appl. No.: 11/798,682

(22) Filed: May 16, 2007

(65) Prior Publication Data

US 2008/0288302 A1   Nov. 20, 2008

(51) Int. Cl.
*G06Q 10/00* (2006.01)
(52) U.S. Cl. .......................................... 705/5; 705/1.1
(58) Field of Classification Search .................... 705/5, 705/1.1, 6
See application file for complete search history.

(56) References Cited

U.S. PATENT DOCUMENTS

| | | | |
|---|---|---|---|
| 6,718,348 B1 | 4/2004 | Novak et al. | |
| 7,013,315 B1 | 3/2006 | Boothby | |
| 7,228,313 B1* | 6/2007 | Hand et al. | 1/1 |
| 7,231,368 B2* | 6/2007 | Pedone, Fernando | 705/44 |
| 7,474,740 B1* | 1/2009 | Smith et al. | 379/88.02 |
| 7,617,136 B1* | 11/2009 | Lessing et al. | 705/28 |
| 2002/0152100 A1 | 10/2002 | Chen et al. | |
| 2002/0178034 A1* | 11/2002 | Gardner et al. | 705/5 |
| 2003/0177044 A1 | 9/2003 | Sokel et al. | |
| 2003/0220858 A1* | 11/2003 | Lam et al. | 705/35 |
| 2004/0138930 A1* | 7/2004 | Barnes et al. | 705/5 |
| 2004/0260652 A1* | 12/2004 | Rose | 705/51 |
| 2005/0192851 A1* | 9/2005 | Rangnekar | 705/5 |
| 2007/0185745 A1* | 8/2007 | Schukraft | 705/5 |
| 2008/0010101 A1* | 1/2008 | Williamson et al. | 705/5 |

(Continued)

FOREIGN PATENT DOCUMENTS

EP    1 475 724    11/2004

OTHER PUBLICATIONS

Huimin Zhao et al., Combining schema and instance information for integrating heterogeneous data sources, Mar. 26, 2006, pp. 281-303.

*Primary Examiner*—Shannon S Saliard
(74) *Attorney, Agent, or Firm*—Young & Thompson

(57) ABSTRACT

A method and a system keeps travel data consistent between a database of airline reservations storing passenger name records (PNR's) including travel segments, and a database of electronic tickets (E-tickets) including travel coupons, this latter database being independently controlled from a ticketing server. Whenever a travel segment is updated or added in one of the PNR's an electronic reconciliation service (ERS) receives images of updated PNR's. Corresponding E-ticket images are requested by ERS and received from the database of E-tickets. Then, ERS establishes a matrix of links between orphan PNR travel segments and orphan E-ticket travel coupons so that E-ticket orphan travel coupons are re-associated with matching PNR orphan travel segments. After E-ticket is updated it is revalidated or reissued. Optionally, a penalty generator calculates penalty fees on the basis of changes brought to the revalidated or reissued E-tickets. The penalty fees are then attached to the updated PNR's.

9 Claims, 4 Drawing Sheets

U.S. PATENT DOCUMENTS

2008/0027768 A1* 1/2008 Thurlow et al. ................ 705/6
2008/0162196 A1* 7/2008 Espinosa et al. ............... 705/5
2008/0228534 A1* 9/2008 Sink et al. ..................... 705/6

* cited by examiner

METHOD AND SYSTEM FOR AUTOMATICALLY KEEPING TRAVEL DATA CONSISTENT BETWEEN PASSENGER RESERVATION RECORDS AND CORRESPONDING ELECTRONIC TICKETS

FIELD OF THE INVENTION

The present invention relates generally to computerized travel transactions and more specifically to a method and a system for automatically keeping travel data consistent between passenger reservation records and the corresponding electronic tickets that are held on different databases controlled from independent systems.

BACKGROUND OF THE INVENTION

Until recently, delivery of paper tickets by travel companies to their customers was the norm when booking a trip. However, travel companies and particularly airlines companies, in an attempt to reduce their operating expenses in an extremely competitive business environment, have started 'delivering' electronic ticket or E-ticket instead. This dematerialized form of airline ticket is rapidly replacing the traditional paper tickets. Once a reservation is made, an E-ticket thus exists only as a digital record in the computers of the corresponding airline company or in the computers of a global distribution system (GDS), such as AMADEUS, a worldwide service provider for the travel industry and airline companies. E-ticket is thus a paperless electronic document, a file in a computer, used to represent the purchase of a seat on an aircraft airline, traditionally through a travel agency and also through a website or by telephone. It generally just takes the form of a confirmation number assigned to the passenger, along with the flight number(s), date(s), departure location(s), and destination location(s) of his/her trip. Among many alternate possibilities, this essential travel information can be: printed, e-mailed, forwarded to a mobile device or added to the passenger personal digital assistant calendar application. Hence, when checking in at the airport, passenger has simply to present positive identification to get a boarding pass and have his/her luggage checked.

An example of a state-of-the-art E-ticketing computerized travel system environment, of the kind put in place by GDS's and other travel providers, is shown in FIG. 1. In this environment, E-ticket (115) is created on the basis of information provided to a first computer platform (125) by the passenger desiring to make a reservation. Information must include all necessary flight details to complete reservation such as the travel dates, boarding points, flying class and so on, along with the passenger name and address, the form of payment, etc. Passenger reservation (110) is generally referred to as the passenger name record or PNR. All PNR's controlled by a reservation system (125) are held in at least one appropriate database (130). Such a reservation system is traditionally accessed by a travel agent on behalf of a travel agency customer. The advent of the Internet and of its ubiquitous application: the World Wide Web or Web, has however promoted a direct access to reservation systems by end-users of various online travel applications (OLTA). End-users can then book themselves a flight or a complete trip through online travel service providers such as: Opodo®, Expedia® and Travelocity®. In both cases travel information necessary to create PNR is provided from some sort of client travel software applications either run from a travel agency, by a travel agent on behalf of a customer, or from end-users that typically use Web browsers on their personal computers (120) to access an online travel service application of their choice.

In the state-of-the-art computing environment depicted in FIG. 1, once completed, PNR (110) triggers the creation of a corresponding E-ticket (115) on a separate system, i.e.: an electronic ticketing server or ETS (140). Communications between the various components, i.e.: the reservation platform (125), the electronic ticketing server (140) and the end-users or travel agencies (120) are achieved with traditional means and protocols through a mix of public and private networks (155) including the GDS private network(s) and the Internet. Then, E-ticket is stored in a dedicated database (150) under the control of ETS from where it can be retrieved to be consulted when necessary by the travel agent who has issued the PNR or by the end-user of the corresponding online travel application and, in any case, when passenger checks in at the airport.

In the general case of a reservation (110) there are more than one flight segment per PNR. Each of them is then associated (112) with a corresponding coupon when E-ticket (115) is created. However, once E-ticket is created, any change done on the flight details of the reservation does not automatically trigger a corresponding change of the electronic ticket. Indeed, there is currently no automatic process to complete this task. Hence, E-ticket must also be manually updated. If passenger has requested the assistance of a professional in a travel agency it is up to the travel agent to update manually the E-ticket with the requested changes (160). Otherwise, the document and the reservation become de-synchronized, and the segment and its corresponding coupon are orphan, i.e. segment is no longer associated with a coupon (170). De-synchronization thus always requires costly human intervention and can adversely impair check in and boarding, thus greatly offsetting the advantage of having implemented E-ticketing.

The changes done in the reservation can be requested by the passenger. These are voluntary changes, as opposed to involuntary changes initiated by the airline or travel agent. Involuntary changes are for example the result of a flight cancellation or of schedule changes. Depending on what commercial policy they apply, airlines and travel providers may require charging penalties for voluntary changes according to a set of predefined calculation rules. The generation of penalties must also be triggered manually prior to the updating of the E-ticket. Moreover, because this is not mandatory, if the travel agent does not launch the corresponding process, the airline will not collect any fee for the reservation change thus impacting airline revenues.

In a very competitive business environment the main corporate objective of all airlines and travel providers is indeed to reduce their operational costs to stay profitable. To this end, electronic ticketing, which is far less costly, is a prime contributor to achieve it provided it can be thoroughly carried out without impairment.

It is therefore an overall objective of the invention to have all passengers travel ready at check in time in spite of the changes they may have done to their travel plans, thus requiring no or few human interventions at that critical time while enabling an automatic collection of the change fees when applicable.

It is also a specific objective of the invention to overcome the lack of automatic synchronization between E-tickets and PNR's here above discussed.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention describes a method and a system to keep travel data consistent between a database of airline reservations storing passenger name records (PNR's) comprised of travel segments and a database of electronic tickets (E-tickets) comprised of travel coupons, this latter database being independently controlled from a ticketing server. Whenever a travel segment is updated or added in one of the PNR's an electronic reconciliation service (ERS) receives images of updated PNR's. Corresponding E-ticket images are requested by ERS and received from the database of E-tickets. Then, ERS establishes a matrix of links between orphan PNR travel segments and orphan E-ticket travel coupons so that E-ticket orphan travel coupons are re-associated with matching PNR orphan travel segments. After E-ticket is updated it is revalidated or reissued. Optionally, if applicable, a penalty generator is requested to calculate penalty fees on the basis of changes brought to the revalidated or reissued E-tickets. The penalty fees are then attached to the updated PNR's.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 1:
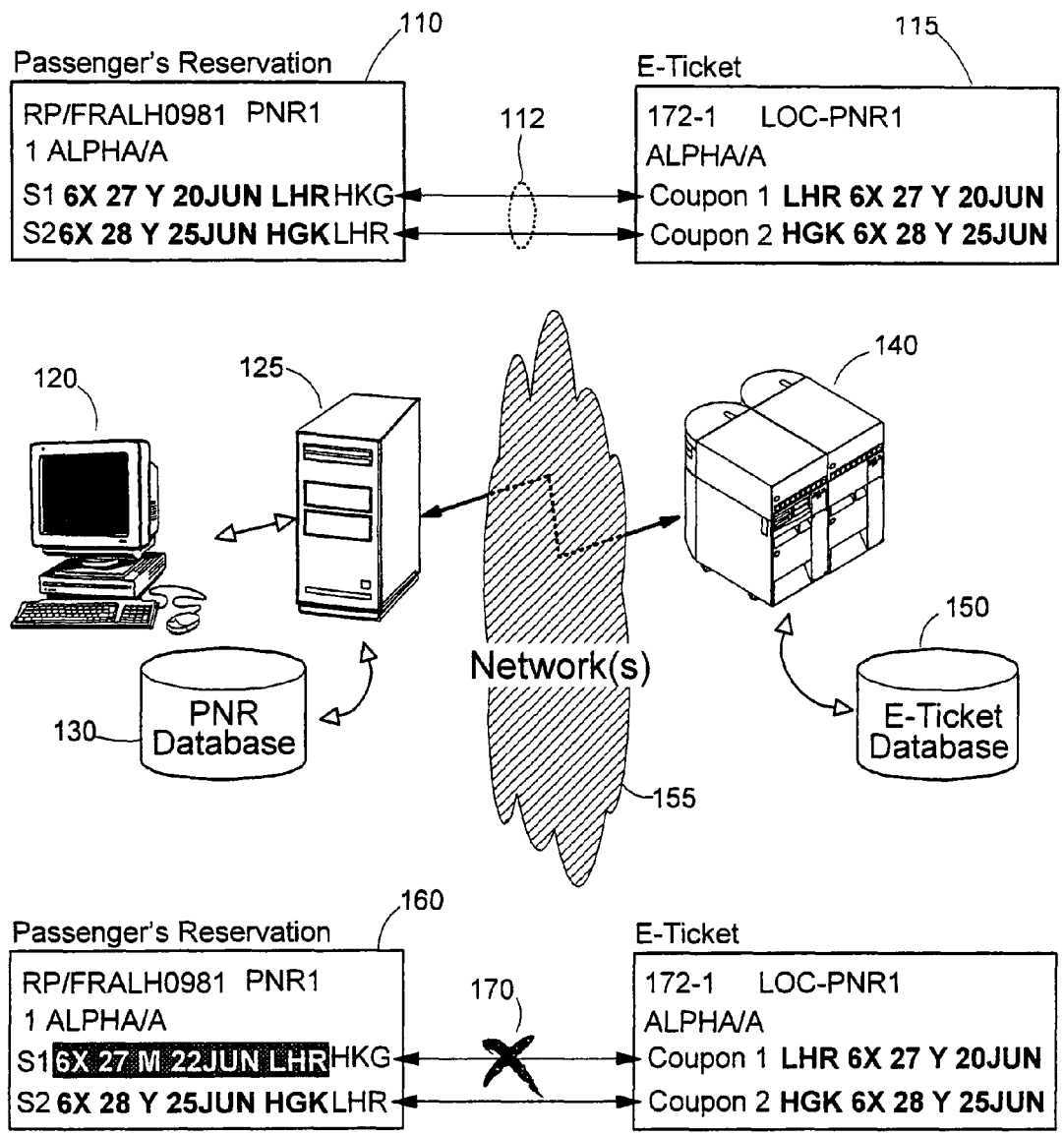
FIG. 1 depicts a state-of-the-art computing environment in which electronic ticketing takes place.
Figure 2:
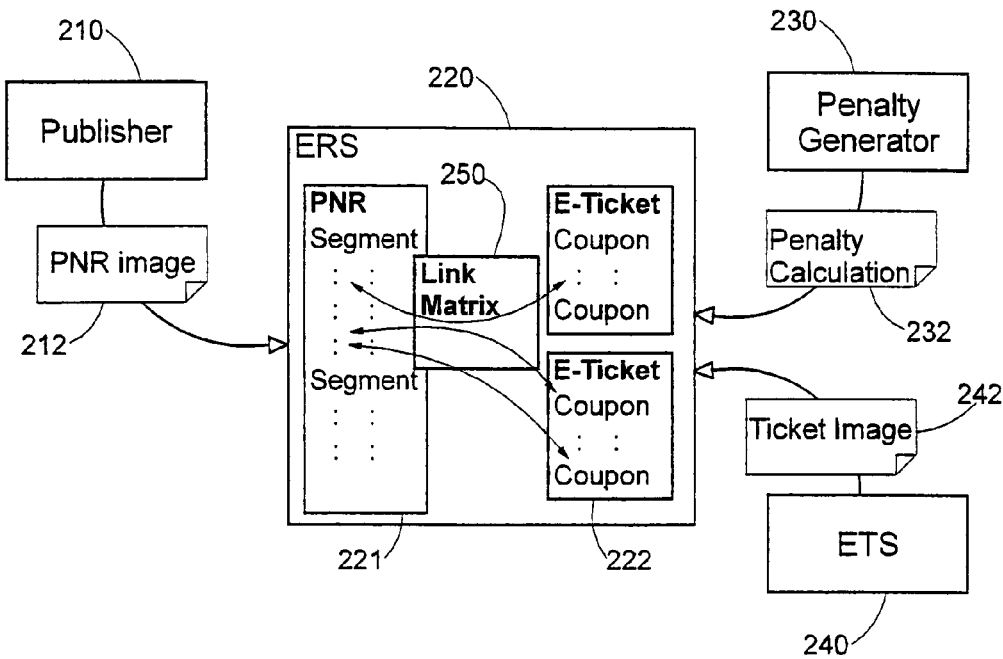
FIG. 2 describes the global architecture of an E-ticket reconciliation service (ERS) according to the invention.

FIG. 2 describes the global architecture of an E-ticket reconciliation service (ERS) according to the invention and the interactions with external components such as the penalty generator (230), the electronic ticketing server or ETS (240) and the publisher (210).

Publisher is the component in charge of forwarding PNR's that need to be analyzed by ERS (220). PNR's are sent under the form of standard messages (212) containing PNR images to ERS service which extracts from them the proper information so that each newly received PNR can be checked to determine if a reconciliation is actually needed. To this end, in response to a standard request (E-ticket display request/response) issued by ERS towards ETS (240), corresponding ticket image (242) is also retrieved and forwarded to ERS.

Once ERS has got PNR and E-ticket images (221, 222) it builds a matrix of links (250) between E-ticket orphan coupons and PNR orphan segments if any. Matching is achieved, when possible, with the help of the exemplary matching algorithm further discussed in FIG. 5.

Figure 3:
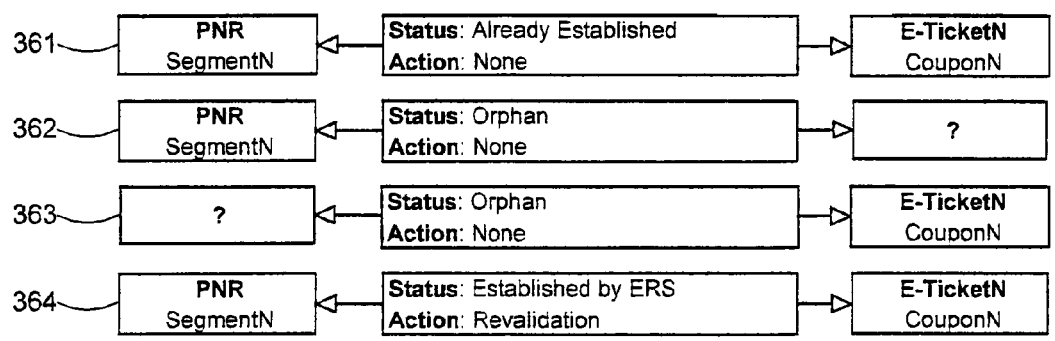
FIG. 3 shows the various kinds of link statuses considered by the link matrix of ERS.

FIG. 3 shows the various kinds of link statuses considered by ERS link matrix (250) of previous figure. They are as follows:

If a link is already established (361), i.e., if link that was created when E-ticket was first issued or re-issued is still valid nothing is to be done by ERS.

Orphan links are found if a de-synchronization has been introduced between previously associated coupons and segments as a result of PNR changes or because PNR contains non-ticketed segments. Hence, coupon has no corresponding segment (362) or segment has no corresponding coupon (363). It is the purpose of ERS to repair those links.

Repaired linked have the corresponding status, i.e.: 'established by ERS', after links were automatically revalidated or re-issued (364).

Figure 4:
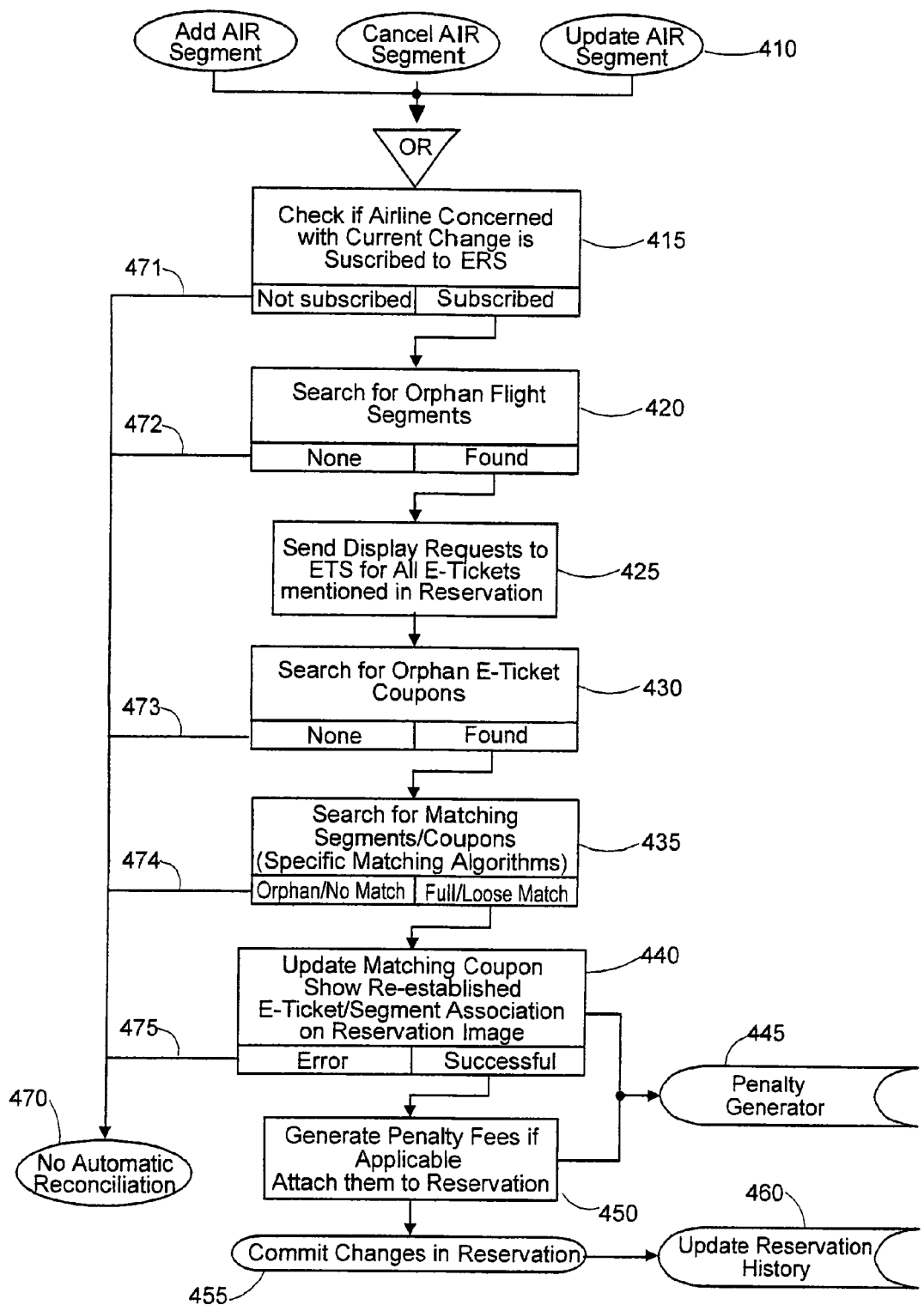
FIG. 4 is the flow chart of operations done by ERS to perform reconciliation between PNR segments and E-ticket coupons.

FIG. 4 is the flow chart of operations performed by ERS while reconciliation of orphan segments and orphan coupons are being performed for each passenger of a PNR.

As already mentioned in FIG. 2, publisher (210) that watches all transactions performed on a reservation database, triggers the reconciliation service through the sending of a message to ERS, containing an image of the PNR, each time a reservation is changed. As also mentioned previously changes are traditionally made by travel agents on behalf of a customer but can be as well the result of changes requested directly from end-users of online travel applications. Whichever their actual origin is, changes to be brought to a PNR can be of three sorts: a PNR air segment is either updated or cancelled or an air segment is added (410).

If the airline concerned by the change has actually subscribed to the reconciliation service of the invention (415) a search of orphan flight segments is immediately undertaken (420) over the PNR. Otherwise (471), no automatic reconciliation is attempted (470). Typically, the E-ticket reconciliation service of the invention is provided by a GDS, a provider of travel services as discussed in the background section, to which airline companies may have subscribed or not.

If no orphan flight segments are found (472) no automatic reconciliation is necessary (470). Otherwise, all corresponding E-tickets mentioned in reservation must be retrieved (425). This is achieved as previously described through the sending of a corresponding request (display request) to the electronic ticketing server (240) shown in FIG. 2 which returns an image of requested E-tickets to ERS.

Then, ERS can search for orphan coupons in requested E-tickets (430). If none are found (473), no automatic reconciliation is further attempted (470). Otherwise, matching between orphan segments and orphan coupons is undertaken (435). An example of the matching process is described in FIG. 5. Various matching algorithms can however be applied depending on the particular applications of the invention. If, after matching process has been executed, no matching can however be found (474) no automatic reconciliation can be done (470).

If matching segments and coupons can be found though, corresponding re-associations are performed so that PNR and E-tickets are updated (440). If errors (475) are however detected no automatic reconciliation is attempted (470). Otherwise, if successful, and when applicable, penalties need to be calculated by the penalty generator (445) previously discussed in FIG. 2. Penalties are attached to the reservation (450). Then, changes in reservation are committed (455) and reservation history updated (460).

As also already mentioned, depending on the importance of changes done in PNR and rules attached to the initial PNR fare, E-ticket will be just revalidated or re-issued thus affecting the amount of computed penalties to be attached to the reservation. Inputs of penalty generator are thus obtained from step (440) so that it can generate and deliver the penalties attached to the reservation (450).

Figure 5:
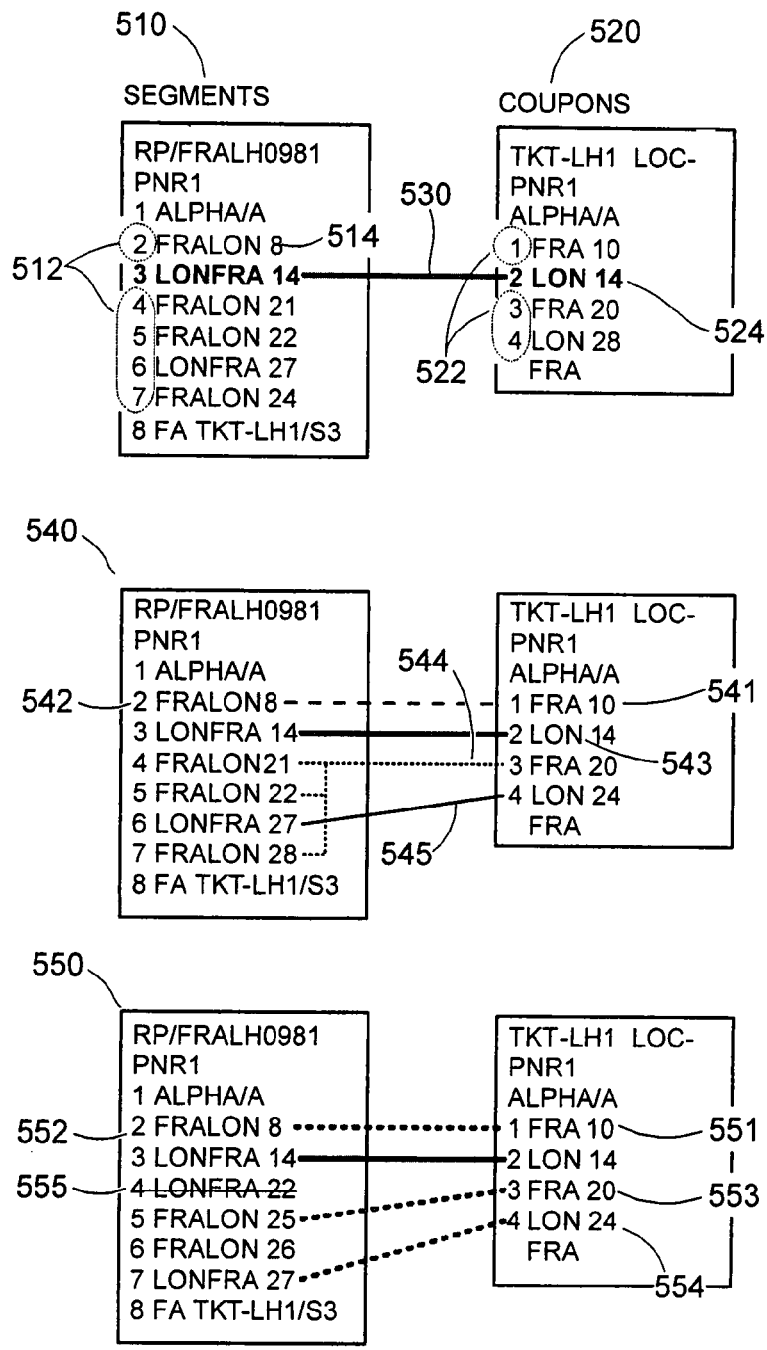
FIG. 5 describes how matching process is performed by ERS between orphan segments of a PNR and orphan coupons of corresponding E-ticket.

FIG. 5 describes, through an example, how matching process is performed by the electronic ticket reconciliation service (ERS) of the invention between orphan segments of a PNR (510) and the orphan coupons (520) of corresponding E-ticket.

In the process of matching orphan segments and coupons the chronological order of the coupons must always be maintained. This implies that a coupon cannot be re-associated with a segment unless its departure date is indeed comprised between the one of coupon immediately preceding and the date of coupon that immediately follows. A 'full matching' of coupon and segment is achieved if only their departure dates are different. A 'loose matching' is obtained if airline, flight number, flight date and/or class of service differ while airports stay the same, i.e., are within the same city pair. Obviously, 'full matching' get precedence over 'loose matching' when segment and coupons are re-associated by ERS.

In the example of FIG. 5 the unassociated or orphan segments resulting of changes brought to PNR (510) are those indexed 2 and 4 to 7 (512). The corresponding unassociated or orphan coupons of ticket are at indexes 1, 3 and 4 (522). The associated segment and coupon left is shown in bold characters (530). Coupons are listed in successive order of their departure cities. Hence, in (520), there are four coupons listed. The first one, at index 1, corresponds to a coupon from FRANKFURT, Germany (city: code: FRA) to LONDON, United Kingdom (city code: LON). The second one, at index 2, is from LONDON to FRANKFURT and so on.

The first step of the matching process is aimed at verifying that chronological order can be maintained after revalidation of E-ticket. This implies that, for a given orphan coupon, those of segments which would change the sequence of E-ticket coupons are invalidated. This is achieved as follows for each orphan coupon:

Find the first preceding coupon still associated with a segment.

Find the first following coupon still associated with a segment.

Then, initial list of candidate segments for current orphan coupon is strictly comprised of the segments between the first preceding and the first following associated segments.

In example of FIG. 5, the orphan coupon at index 1 is still possibly in sequence with segment at index 2 because date attached to this segment (514) is 8. This value being less than 14, i.e., the date of the non orphan coupon that immediately follows (524); it is indeed feasible to match the corresponding segment and coupon. The same remark applies to the orphan coupons at indexes 3 and 4 which could match any of the orphan segments at indexes 4 to 7 since their attached dates are greater than 14, i.e., the date of the non orphan coupon (524) that immediately precedes them.

Because segment and coupons must share the same city pairs the next step of the re-association process checks this property so that routes are actually matching (different airports within the same city give a route matching). For a given coupon, ERS removes segments with different city pairs if any. The result of this step is a list of candidate segments for each coupon as shown in FIG. 5 (540). In this example, coupon at index 1 (541) and segment at index 2 (542) share a same route noted FRALON, the standard airline short notation for a flight route from FRANKFURT, Germany to LONDON, United Kingdom as already discussed above. Because coupon assumes passenger leaves on day 10 from FRANKFURT for LONDON, i.e., the departure city of next coupon (543), routes indeed match. The next orphan coupon at index 3 corresponds also to the same route (FRALON) matching with segments at indexes 4, 5 and 7 (544). Finally, the route of last orphan coupon at index 4 is found to match with the route of segment at index 6 (545).

Once the above checking step of the re-association process is complete ERS must elect only one candidate segment per orphan coupon. Then, for each passenger, ERS proceeds with each unassociated coupon left in chronological order as in the exemplary following sequence:

If current coupon considered has only one possible candidate segment and that segment is the candidate of only one coupon it is elected.

Otherwise:

ERS looks for a coupon perfectly matching the current only possible candidate segment. If such a coupon is indeed found it is elected.

Otherwise:

the first chronological coupon is elected.

However, if current coupon has several candidate segments, and:

if there is no other coupon matching with any of the several candidate segments, then ERS looks for a segment perfectly matching with current coupon. If found, this segment is elected.

Otherwise:

the first chronological segment is elected.

As a consequence of the above sequence of processing steps, each time a segment is elected, i.e., re-associated with an orphan coupon, the elected segment, and all preceding ones (not yet-elected), are no longer valid candidate segments; thus, are not further considered.

It must be however noticed here that the above sequence is intended to just be a simple example of how matching algorithm can be actually operated in the framework of the invention. Depending on specific applications of the invention; especially, depending on airline preferences, more sophisticated matching sequences may have to be considered so that algorithm is overall better adapted to fulfill the particular objectives considered when implementing the invention for a given application. Above matching algorithm can be easily tailored while the overall mode of operation of the invention stays identical.

As a result of this elective process shown through the particular example of FIG. 5 (550) orphan coupon at index 1 (551), the first to be processed, has only one possible candidate segment (552) to be associated with. Hence, ERS elects this segment and re-associates it with current coupon. As mentioned above the just elected segment can no longer be a candidate segment for further re-associations. Then, matching algorithm proceeds with next orphan coupon, i.e., the one at index 3 (553). This coupon has two possible candidate segments at indexes 5 and 6, hence the first chronological one is selected, i.e.: the one at index 5. Finally, the remaining orphan coupon at index 4 (554) is left with two possible segments to be re-associated with, i.e.: the ones at indexes 4 and 7. However, as a result of having already elected segment at index 5 at previous step the one at index 4 is no longer a valid candidate and is eliminated (555). Hence, ERS elects segment at index 7 to be re-associated with last orphan coupon (554) which ends the re-association process.

After segments and coupons have been eventually re-associated as a result of the building of the matrix of links (250) shown in FIG. 2 and exemplary matching process just discussed above penalties to be paid by the passenger for the requested changes are possibly generated by the penalty generator (230) on the basis of a predefined set of rules. Computed penalties will generally depend on the fact that ticket is just revalidated or need to be re-issued. Decision of re-issuing or just revalidating the E-ticket may depend of the amount of requested changes and also of the fare and rules attached to the original ticket. In any case, result of penalty calculation is returned to ERS under the form of a corresponding message (232) as shown in FIG. 2.

What is claimed is:

1. A method of keeping travel data consistent between a first database of airline reservations storing passenger name records (PNR's) comprised of travel segments and a second database of electronic tickets (E-tickets) comprised of travel coupons, the second database being independently controlled from a ticketing server, the method comprising:
whenever at least one travel segment is updated or added in one of the PNR's, performing via programmed computer processors, the steps of:
receiving images of updated PNR's from the first database;
requesting and receiving images of corresponding E-tickets from the second database;
establishing a matrix of links between orphan PNR travel segments and orphan E-ticket travel coupons;
updating the E-tickets by re-associating orphan E-ticket travel coupons with matching orphan PNR travel segments; and
revalidating or reissuing the E-tickets.

2. The method of claim 1 including the further steps of:
requesting from a penalty generator calculation of penalty fees on the basis of changes brought to the revalidated or reissued E-tickets; and
attaching the penalty fees to the updated PNR's.

3. The method of claim 1 wherein the re-associating step of matching orphan travel coupons with orphan travel segments includes the steps of:
invalidating orphan segments that would not maintain the chronological order of orphan coupons;
removing orphan segments not matching with city pairs of orphan coupons;
electing among remaining candidate segments one orphan segment for each orphan coupon considered in chronological order.

4. The method of claim 3 wherein there is only one candidate segment for the current orphan coupon considered by the electing step, including the further steps of:
if the only one candidate segment is the candidate of a single coupon,
electing the only one candidate segment;
if not,
searching for another coupon perfectly matching the only one candidate segment;
if found,
electing the perfectly matching coupon;
if not found,
electing the first chronological orphan coupon.

5. The method of claim 3 wherein there are several candidate segments for the current orphan coupon considered by the electing step, including the further steps of:
if no other coupon is matching with any of the several candidate segments,
searching for another segment perfectly matching the current coupon;
if found,
electing the perfectly matching segment;
if not found,
electing the first chronological orphan segment.

6. A system to perform an electronic ticket (E-ticket) reconciliation service (ERS), comprising:
a publisher to forward images of passenger name records (PNR's);
an electronic ticketing server (ETS) revalidates or re-issues E-tickets after PNR segments and E-ticket coupons have been re-associated by the ERS;
an electronic ticket reconciliation system for receiving the PNR images, for requesting and receiving, to/from ETS, corresponding E-ticket images and for re-associating PNR segments with E-ticket coupons.

7. The system of claim 6 wherein ERS further include a link matrix for matching the PNR segments with the E-ticket coupons.

8. The system of claim 6 further including a penalty generator.

9. The system of claim 8 wherein ERS forwards a request to the penalty generator and receives the amount of computed fees corresponding to the re-association of PNR segments with E-ticket coupons and wherein penalty fees are attached to PNR's.

* * * * *